Nov. 22, 1949     V. D. ACKERMAN     2,488,697
PISTON RING
Filed July 15, 1944

INVENTOR.
Virgil D. Ackerman
BY
Earl D. Chappell
ATTORNEYS.

Patented Nov. 22, 1949

2,488,697

UNITED STATES PATENT OFFICE 2,488,697

PISTON RING

Virgil D. Ackerman, Hastings, Mich., assignor to Hastings Manufacturing Company, Hastings, Mich.

Application July 15, 1944, Serial No. 545,042

6 Claims. (Cl. 309—44)

This invention relates to improvements in piston rings.

The main objects of this invention are:

First, to provide an improved piston ring which expands and contracts freely in the groove with usual clearances and one which is of long life, even under severe conditions of wear.

Second, to provide a piston ring in which the wear on the sides of the ring element due to axial and radial movement is minimized.

Third, to provide a cast iron piston ring having a cylinder wall contacting surface or face in which a sharp or annular edge is maintained throughout the life of the ring element.

Objects pertaining to details and economies of the invention will definitely appear from the description to follow. The invention is defined in the claims.

A piston ring embodying the features of the invention is clearly illustrated in the accompanying drawing, in which.

Figure 1:
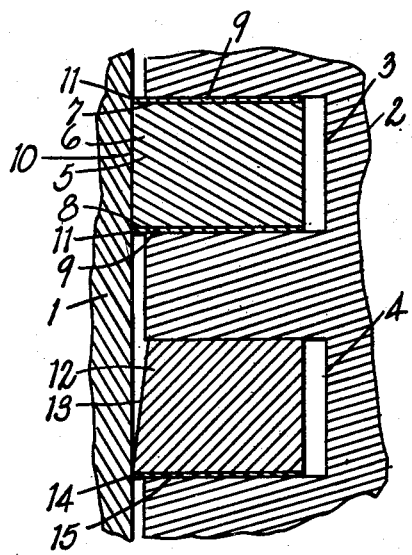
Fig. 1 is an enlarged fragmentary view of a piston and cylinder with compression and scraper rings operatively associated therewith, no attempt being made to show proper clearances.
Figure 2:
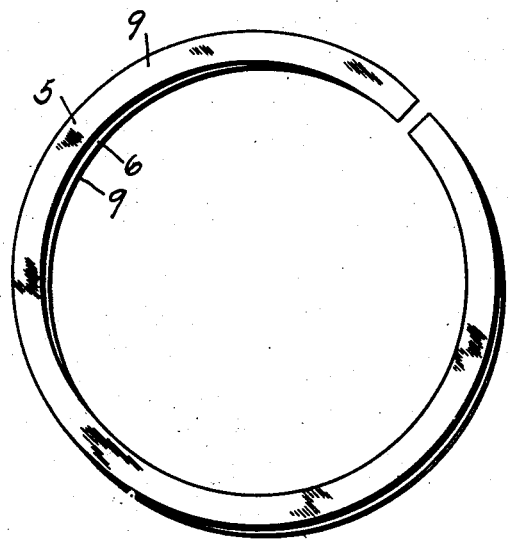
Fig. 2 is a perspective view of a piston ring embodying my invention.

In the accompanying drawing 1 represents a cylinder and 2 a piston, the piston having a compression ring groove 3 and a scraper ring groove 4. The piston ring 5 is an embodiment of this invention adapted as a compression ring, that is, a ring used in the top groove of a piston. This ring 5 comprises a split cast iron body portion 6, the top and bottom sides 7 and 8 of which are provided with a chromium plating 9 extending throughout the full dimension of the sides, that is, preferably extending from the inner peripheral edge to the outer peripheral wear face or cylinder contacting face 10 of the ring. This provides wear resisting corners 11, the face of the ring between these wear resisting corners being unplated. These wear-resisting corners to the cylinder contacting face of the ring remain sharp or angular as the ring wears down and do not become rounded as commonly results in cast iron piston rings.

Another advantage is that plated smooth sides are provided for both the top and bottom of the ring to coact with the top and bottom walls of the grooves to limit axial movement of the ring in the ring groove, that is movement in the direction of the axis of the ring or in other words at right angles to the top and bottom plated sides of the ring. This minimizes the wear of the ring and the canting of the ring incident to such wear. Further, the hard chromium plated surfaces have less tendency to stick or adhere to the wall than the sides of a cast iron ring.

For the second or scraper ring groove 4 I preferably embody my invention in a ring 12 having an upwardly inclined peripheral face 13 which terminates in an acute angled cylinder engaging portion 14. The bottom side of the ring is provided with a chromium plating 15 which extends to the extreme peripheral edge of the ring, thus providing an extremely long-lived sharp scraping edge which is designed to perform its scraping function on the down stroke only.

Figure 3:
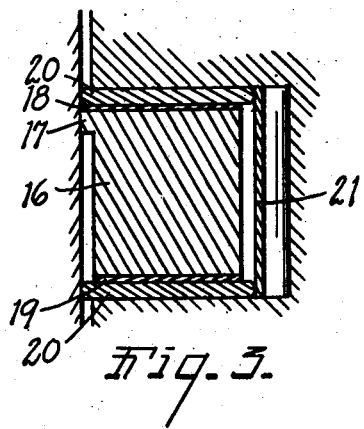
Fig. 3 is a fragmentary section showing a modified form or embodiment of the invention.

In the embodiment of my invention shown in Fig. 3 the cast iron spacer element 16 is provided with an annular cylinder contacting rib 17 and has chromium plating 18 on the adjacent side extending to the peripheral edge of this cylinder contacting surface, thus maintaining a hard, sharp wear-resisting corner for such surface. The bottom of the ring, which does not extend to the cylinder wall, is provided with a plating 19.

This spacer element is operatively associated with independent cylinder wall contacting sections or members 20 formed of ribbon steel. These elements normally have rounded edges such as result from the rolling of the steel ribbon from which they are formed. The sharp edge of the spacer permanently maintained is a desirable feature in this combination. In this construction the expander 21 preferably contacts only with the steel segments. If desired the steel segments may be chromium plated on one or both sides, but as applied in the structure illustrated the side members and the spacer have a very free relative movement, which is a highly desirable feature.

Another advantage of a structure such as that of the ring 5 of Fig. 1 is that the uncoated cast iron cylinder wall contacting face effectively retains a substantial amount of lubricant, that is, the portions of the ring between the two chromium side faces being relatively porous, they are relatively efficient in retaining lubricant.

I have not attempted to illustrate and describe all the modifications and adaptations of my invention which I contemplate as it is believed this disclosure will enable those skilled in the art to embody or adapt the invention as best calculated to meet the particular requirements for a ring designed to function in a compression groove, scraper groove or oil groove, as the case may be.

Having thus described my invention, what I claim as new and desire to secure by Letters Patent is:

1. A split resilient cast iron piston ring having an upwardly inclined peripheral surface, the bottom side of the ring being chromium plated throughout, the plating extending to the cylinder contacting edge of the ring and constituting a wear-resistant ring bottom side wall engageable with the bottom side wall of the piston ring groove, said upwardly inclined peripheral surface above the chromium plating being softer than the chrome plating to facilitate maintenance of a relatively sharp bottom corner edge during the life of the ring 2. A flat resilient cast iron piston ring element having chromium plated top and bottom sides, the plating extending to the cylinder contacting peripheral edges thereof, the face of the ring other than said contacting edges being unplated.

3. A split resilient cast iron piston ring having a peripheral cylinder wall contacting surface of cast iron and having a flat side, such side being chromium plated, the plating constituting a wear resistant ring outer side wall engageable with a side wall of a piston ring groove to limit axial movement of the ring in the ring groove, the plating extending to the cylinder wall contacting edge of the ring whereby a chromium plated wear resisting edge is provided flush with the cast iron cylinder contacting face of the ring, the relatively hard chromium plated edge as compared to said cast iron cylinder contacting face maintaining a relatively sharp cylinder contacting ring edge during the life of the ring.

4. A split resilient piston ring having a peripheral cylinder contacting surface and having at least one side thereof terminating in a cylinder contacting edge, the side having such edge being chromium plated, the plating constituting a wear resistant ring outer side wall engageable with a side wall of a piston ring groove to limit axial movement of the ring in the ring groove, the edge of the chromium plating extending to the cylinder contacting surface, the cylinder contacting surface of the ring adjacent said contacting edge being relatively soft as compared to said edge to maintain a relatively sharp ring edge during the life of the ring.

5. A split resilient piston ring element having a chrome plated side, the plating constituting a wear resistant ring outer side wall engageable to limit axial movement of the ring in a piston ring groove, the plating extending to the cylinder contacting edge of the ring, the ring element axially adjacent said plated edge being relatively soft as compared to said plated edge.

6. A resilient cast iron piston ring element having a chrome plated side, the plating constituting a wear resistant ring outer side wall engageable to limit axial movement of the ring in a piston ring groove, the plating extending to the cylinder contacting peripheral edge of such side, the cylinder contacting face of the ring other than said contacting edge being unplated and relatively soft as compared to said edge.

VIRGIL D. ACKERMAN.

REFERENCES CITED

The following references are of record in the file of this patent:

UNITED STATES PATENTS

| Number | Name | Date |
|---|---|---|
| 1,435,592 | Doan | Nov. 14, 1922 |
| 1,956,014 | Fink | Apr. 24, 1934 |

FOREIGN PATENTS

| Number | Country | Date |
|---|---|---|
| 99,174 | Sweden | June 18, 1940 |
| 840,101 | France | Apr. 19, 1939 |